Patented June 9, 1925.

1,541,606

UNITED STATES PATENT OFFICE.

CYRUS S. WERT, OF KENDALLVILLE, INDIANA.

COMPOSITION OF MATTER FOR FACING CONCRETE BLOCKS.

No Drawing.   Application filed August 31, 1921.   Serial No. 497,142.

*To all whom it may concern:*

Be it known that I, CYRUS S. WERT, residing at Kendallville, in the county of Noble and State of Indiana, a citizen of the United States, have invented certain new and useful Improvements in Composition of Matter for Facing Concrete Blocks, of which the following is a specification.

My invention relates to a composition of matter for use in facing or finishing concrete blocks and has for its object to provide a composition which will be easily applied to concrete blocks and which when applied will form a facing or finish which will be hard, waterproof, fireproof and durable, will give a desirable appearance to the block, will not scale or peel off and will protect the block from weather action.

With these objects in view my invention consists in the composition hereinafter described and claimed.

The composition is made by taking cement, fine sand and finely divided limestone, commonly known as marble dust, in the proportions of one part of each mixing them dry and mixing with them a small quantity of hydrate of lime and then wetting the mixture sufficiently to permit it to be poured readily preferably with lime water, that is water containing in solution as much hydrate of lime as it will dissolve.

The cement used should be preferably a good grade of Portland cement though other hydraulic cement may be used.

This composition should be applied to the cement block while the block is in green condition, that is has not set more than merely enough to enable it to retain the shape given to it by the mold in which it is formed, and after being applied, is forced into intimate union with the block by tamping.

Before the block with its facing is removed from the mold it should be wetted with lime water, that is water containing as much hydrate of lime as it will dissolve, and also containing in solution, soluble silicate, commonly known as water glass, in the proportion of one pint of commercial water glass to five gallons of the lime water.

After the faced block is removed from the mold, at repeated intervals during the drying out or curing process, it is watered with the lime water containing water glass as above described, the solution being applied particularly to the facing.

The water glass in the solution thus applied to the block gives a brilliant surface appearance and being carried in solution into the block while it is in a green state serves, after the water has evaporated, to close the pores and to aid in holding the facing in a perfect bond with the main portion of the block. Concrete formed from fine sand, marble dust and cement when set is highly resistant to water but its water resistant qualities are greatly increased by the addition of the hydrate of lime and particularly by the addition of the water glass.

By using the water glass in the dilute solution described it is thoroughly disseminated so that when the excess of water has evaporated it will not be present at any one point in sufficient amount to injure the block when it is dried out.

The hydrate of lime may be omitted from the water with which the dry mixture first formed is wetted, but the best results appear to be obtained by its use. It is also found desirable to use the lime water with water glass in solution for this purpose, and in fact it is found desirable to make up a large quantity of this lime water with water glass in solution and to use it in wetting up the concrete mixture for use in making the main portion of the block as well as in the facing mixture.

Having thus described my invention what I claim is:

A facing mixture for concrete blocks consisting of a mixture of equal parts of cement, fine sand and marble dust with a small quantity of powdered hydrated lime mixed therewith, the mixture being wetted with water containing as much hydrated lime as it will dissolve and containing also water glass in the proportion of one pint of water glass to five gallons of the water containing the hydrated lime.

In testimony whereof I hereunto affix my signature.

CYRUS S. WERT.